(12) United States Patent
Saeed et al.

(10) Patent No.: US 12,044,120 B2
(45) Date of Patent: Jul. 23, 2024

(54) METHODS AND APPARATUS FOR DOWNHOLE GEOMETRY RECONSTRUCTION AND FEATURE DETECTION AND CLASSIFICATION

(71) Applicant: Saudi Arabian Oil Company, Dhahran (SA)

(72) Inventors: Abubaker Saeed, Dhahran (SA); Juanpablo Rodriguez, Brooklyn, NY (US); Narmeen Khan, Brooklyn, NY (US); Jeffrey Shasho, Brooklyn, NY (US)

(73) Assignee: Saudi Arabian Oil Company, Dhahran (SA)

( * ) Notice: Subject to any disclaimer, the term of this patent is extended or adjusted under 35 U.S.C. 154(b) by 309 days.

(21) Appl. No.: 16/919,945

(22) Filed: Jul. 2, 2020

(65) Prior Publication Data

US 2022/0003111 A1 Jan. 6, 2022

(51) Int. Cl.
*G01V 1/52* (2006.01)
*E21B 47/002* (2012.01)
*E21B 47/085* (2012.01)
*E21B 47/09* (2012.01)
*E21B 47/14* (2006.01)

(52) U.S. Cl.
CPC ........ *E21B 47/085* (2020.05); *E21B 47/0025* (2020.05); *E21B 47/09* (2013.01); *E21B 47/14* (2013.01); *G01V 1/52* (2013.01)

(58) Field of Classification Search
CPC .... E21B 47/085; E21B 47/0025; E21B 47/09; E21B 47/14; G01V 1/52
See application file for complete search history.

(56) References Cited

U.S. PATENT DOCUMENTS 9,664,030 B2 * 5/2017 Pulley ...................... G01V 1/52
10,408,053 B2 9/2019 Breaux et al.
(Continued)

FOREIGN PATENT DOCUMENTS

GB 2578078 A 4/2020
WO WO-2008076110 A1 * 6/2008 ............... G01V 1/44
(Continued)

OTHER PUBLICATIONS

International Search Report and Written Opinion in corresponding PCT Application No. PCT/US2021/039836 mailed Oct. 22, 2021.

*Primary Examiner* — Daniel L Murphy
*Assistant Examiner* — Amie M Ndure
(74) *Attorney, Agent, or Firm* — Leason Ellis LLP

(57) ABSTRACT

An apparatus for detecting and determining geometric features inside a borehole comprises a body section coupled to and deployable in the borehole by a conveyor, a head section having a first end pivotably coupled to the body section via a joint and a second end having an array of ultrasonic transducers. The array of transducers comprises, for example, a multiplicity of individual actuator elements and a multiplicity of individual sensor elements. An electronic control unit controls the timing of emission of ultrasonic radiation from the actuator elements of the array, receives signals generated by the sensor elements of the array, and controls movement of the head section via an actuator coupled to the joint. A method for reconstructing a geometry and detecting and identifying features in a borehole is also provided.

16 Claims, 10 Drawing Sheets

(56) References Cited

U.S. PATENT DOCUMENTS

| | | | |
|---|---|---|---|
| 11,415,720 B2 * | 8/2022 | Weng | G01V 1/50 |
| 2008/0135293 A1 | 12/2008 | Tashiro et al. | |
| 2013/0032399 A1 | 2/2013 | Dirksen | |
| 2014/0138084 A1 | 5/2014 | Al-Mulhem | |
| 2015/0198733 A1 | 7/2015 | Lie | |
| 2016/0216393 A1 | 7/2016 | Zhou et al. | |
| 2016/0333640 A1 | 11/2016 | Livescu et al. | |

FOREIGN PATENT DOCUMENTS

| | | | |
|---|---|---|---|
| WO | WO-2012064842 A2 * | 5/2012 | A61P 35/00 |
| WO | 2017119878 A1 | 7/2017 | |
| WO | 2018237305 A1 | 12/2018 | |

\* cited by examiner

METHODS AND APPARATUS FOR DOWNHOLE GEOMETRY RECONSTRUCTION AND FEATURE DETECTION AND CLASSIFICATION

FIELD OF THE DISCLOSURE

The present disclosure relates generally to fossil fuel exploration and production, and more particularly relates to methods and apparatus for downhole geometry reconstruction, and feature detection and classification.

BACKGROUND OF THE DISCLOSURE

Traditionally, bore wells used for oil and gas extraction were vertical and regular. With the advent of advanced fossil fuel drilling techniques, boreholes now often have a complex geometry with a variety of features, such as laterals, bends and washouts. This complexity has caused the need for detecting features and determining downhole geometry in order to better navigate equipment through the various features encountered. For example, ultrasonic and electromagnetic sensors have been added to downhole logging tools to gather downhole geometric data.

Due to shortcomings in the sensor arrangements employed, the methods used to determine geometrical features from sensor data inputs or combinations thereof, conventional downhole sensing navigation tools typically suffer from a limited dynamic range and from reduced effectiveness in hostile (multiphase) flow regimes.

SUMMARY OF THE DISCLOSURE

In light of shortcoming of conventional downhole navigation tools, the present disclosure provides methods and apparatus for apparatus for downhole geometry reconstruction, and feature detection and classification with improved dynamic range and effectiveness.

In one aspect, the present disclosure provides an apparatus for detecting and determining geometric features inside a borehole. The apparatus comprises a body section coupled to and deployable in the borehole by a conveyor, a head section having a first end pivotably coupled to the body section via a joint and a second end including an array of ultrasonic transducers, the array of transducers comprising a multiplicity of individual actuator elements and a multiplicity of individual sensor elements, and an electronic control unit. The electronic control unit is configured, such as by a processor executing code which causes the unit to: a) control timing of emission of ultrasonic radiation from the actuator elements of the array, b) receive signals generated by the sensor elements of the array, and c) control movement of the head section via an actuator coupled to the joint.

In a particular embodiment, the multiplicity of individual actuator element in the array comprises at least 50 actuators. Such an embodiment, or a different one, can include at least 50 individual sensor elements in the array. Such ultrasonic transducer arrays, when positioned in the second end of a head section as described herein, provide a "dense" array. In these or other embodiments with less than or approximately 50 or more actuators, sensors, or both, the ultrasonic transducers can be constructed so as to have a corresponding number of actuators and sensors defining the array in a given embodiment.

In some embodiments, the electronic control unit is configured to trigger the actuator elements of the array to transmit ultrasonic energy in the form of modulated pulses, and to correlate signals received from the sensor elements with the modulated pulses transmitted by the actuator elements.

In some implementations, the joint at which the head section is coupled to the body is a gimbaled ball and socket joint having an actuator controllable by the electronic control unit.

The array can include various ranges of large numbers of elements such as at least 50 transducers, or between 100 and 200 transducers. Each transducer in the array can have an actuator element and a corresponding sensor element. Such arrays, when positioned in the second end of a head section as described herein, provide a "dense" array.

In some embodiments, the apparatus further comprises a communication unit, wherein the electronic control unit is configured to transmit data from signals received from the sensors of the dense array to a processing station at which the data is used to reconstruct downhole geometry and to detect and identify downhole features.

Another embodiment of an apparatus for detecting and determining geometric features inside a borehole comprises a body section having a longitudinal axis coupled to and deployable in the borehole by a conveyor, a head section having a first end coupled to the body section via a joint and a second end including a disk-shaped transducer pivotable on at least one axis perpendicular to the longitudinal axis of the body section, the disk-shaped transducer having an actuator element that emits ultrasonic radiation and a sensor element that receives ultrasonic radiation. And an electronic control unit. The electronic control unit is configured to control timing of emission of ultrasonic radiation from the actuator of the transducer, receive signals generated by the sensor elements of the transducer, and control movement of the transducer so as to cause a face of the transducer to sweep across an angle covering a width of the borehole.

In some implementations, the disk-shaped transducer has two degrees of freedom and is pivotable on two perpendicular axes, each of which are perpendicular to the longitudinal axis of the body of the apparatus.

In some embodiments, the electronic control unit is further configured to trigger the actuator element of the transducer to transmit ultrasonic energy in the form of modulated pulses, and correlate signals received from the sensor of the transducer with the modulated pulses transmitted by the actuator elements.

In some embodiments, the apparatus further comprises a communication unit, wherein the electronic control unit is configured to transmit data from signals received from the sensor of the transducer to a processing station at which the data is used to reconstruct downhole geometry and to detect and identify downhole features.

In another aspect, the present disclosure provides a system for geometrical reconstruction and feature detection and identification with a borehole. The system comprises a conveyor for delivering an apparatus into a borehole, a downhole apparatus coupled to the conveyor including: a body section coupled to and deployable in the borehole by a conveyor; a head section having a first end pivotably coupled to the body section via a joint and a second end including a dense array of ultrasonic transducers, the dense array of transducers comprising a multiplicity of individual actuator elements and a multiplicity of individual sensor elements and an electronic control unit. The electronic control unit is configured to control timing of emission of ultrasonic radiation from the actuator elements of the dense array, receive signals generated by the sensor elements of the dense array reflected from within a section of the borehole, and control movement of the head section via an actuator coupled to the joint. The system also comprises a processing station communicatively coupled to the electronic control unit of the downhole apparatus, the processing station including a processor configured to receive sensor data from the electronic control unit and to execute program instructions for reconstructing a geometry and identify features of the borehole section.

In some implementations, the reconstruction of the geometry of the borehole section includes determine a diameter of the borehole section, identifying lateral or branches, and detecting objects previously installed in the borehole section.

In some embodiments, the electronic control unit of the downhole apparatus is configured to trigger the actuator elements of the dense array to transmit ultrasonic energy in the form of modulated pulses, and to correlate signals received from the sensor elements with the modulated pulses transmitted by the actuator elements.

In some implementations, the joint at which the head section is coupled to the body of the downhole apparatus is a gimbaled ball and socket joint having an actuator controllable by the electronic control unit.

In a further aspect, the present disclosure provides a method of reconstructing a geometry and detecting and identifying features in a borehole. The method comprises positioning a downhole apparatus in the borehole having at least one ultrasonic actuators and at least one ultrasonic sensor, controlling the at least one actuator of the downhole apparatus to transmit modulated pulses of ultrasonic radiation azimuthally and in a forward direction, receiving ultrasonic signals at the at least one ultrasonic sensor, correlate signals received from the at least one sensor with the modulated pulses transmitted by the actuator elements, and reconstructing a geometry of the borehole and features within the borehole using the signals received from the at least one sensor, as correlated with the modulated transmitted pulses.

In some embodiments, the downhole apparatus includes an array of transducers comprising at least 50 individual actuator elements and 50 individual sensor elements. Such a "dense" array can be positioned on a pivotable tip of the downhole apparatus.

In some embodiments, the downhole apparatus has a tip including a disk-shaped pivotable transducer pivotable, the disk-shaped transducer having an actuator element that emits ultrasonic radiation and a sensor element that receives ultrasonic radiation.

In some implementations, the downhole apparatus has a longitudinal axis and wherein the disk-shaped transducer has two degrees of freedom and is pivotable on two perpendicular axes, each of which are perpendicular to the longitudinal axis of the body of the apparatus.

These and other aspects, features, and advantages can be appreciated from the following description of certain embodiments of the invention and the accompanying drawing figures and claims.

DETAILED DESCRIPTION OF CERTAIN EMBODIMENTS OF THE DISCLOSURE

The present disclosure provides embodiments of an apparatus for downhole reconstruction and feature detection and identification. In a first illustrated embodiment, the downhole apparatus includes a moveable sensor head having a dense array of ultrasonic transducers which transmit and receive ultrasonic radiation. The sensor head can be gimbaled, enabling the sensor head to be maneuvered and to enable comprehensive scanning of downhole features. In a second illustrated embodiment, the downhole apparatus includes a single disk-shaped transducer element that performs a mechanical scan at a single frequency.

A pulse compression technique is used to increase the range resolution as well as the signal to noise ratio of the received ultrasonic signal data. The transmitted pulse is modulated and then correlated with the received signal. The pulse compression method improves signal-to-noise ratio and improves detector performance in the presence of multiphase flow.

Figure 1:
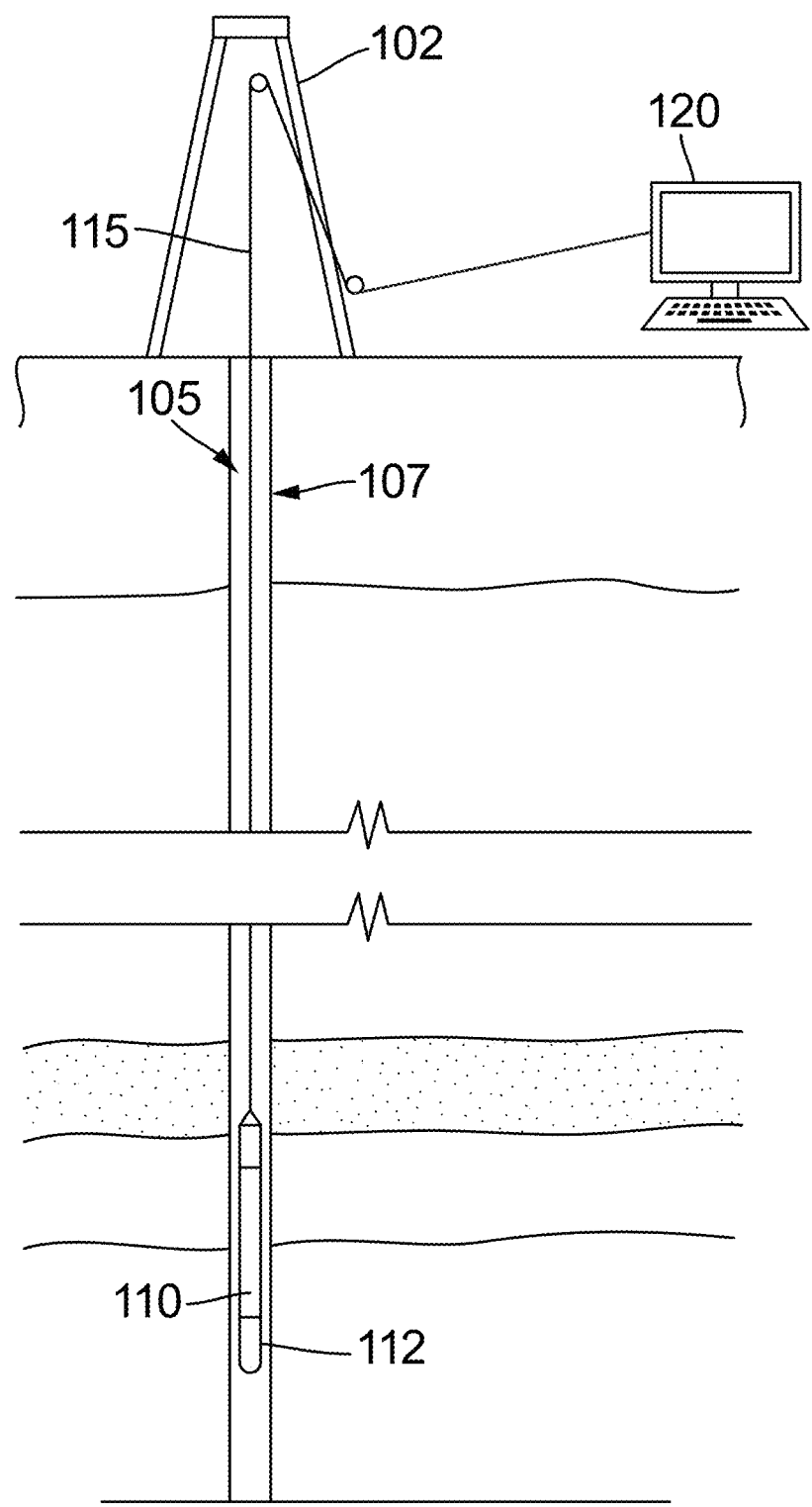
FIG. 1 is a schematic view of an exemplary well system in which the disclosed apparatus and methods can be deployed.

FIG. 1 is a schematic illustration showing an exemplary well system in which the methods and apparatus disclosed herein can be employed. The well system 100 includes a well head 102 that operates over a borehole 105 which extends downwardly underground. An apparatus 110 for downhole geometry reconstruction and feature detection (hereinafter "downhole apparatus") is subterraneously deployed into the borehole 105 via a conveyer 115 such as a cable, wireline or tubing that extends from well head 102. The conveyer 115 can be coupled to a pulley, belt or similar mechanism for raising or lowering the tool within the borehole 105. The distal end 112 of the downhole apparatus 110 includes sensors and actuators, such as ultrasonic transducers.

The ultrasonic transducers are adapted to emit ultrasonic pulses outwardly from the tool towards the periphery 107 of the borehole. Ultrasonic radiation that is reflected from the periphery of the borehole is received by sensor elements of the ultrasonic transducers. This detected radiation is output electronically using means known in the art and provides time-of-flight data from which the distance between the transducers and the periphery of the borehole, and specific features thereof, can be determined. As the tool is raised or lowered within the borehole it can acquire sensor data along specific longitudinal sections, or the entire length of the borehole. This information can be then used to generate a graphic representation of a profile of borehole including the diameter of the borehole measured throughout its length, and features such as protruding features, lateral holes and washouts (sharp increases in diameter).

Referring again to FIG. 1, a processing station 120, receives the data output from the tool directly from the conductor of the conveyer, or alternatively, receives the data wireless via an intermediate telemetry device coupled to the conductor. At the processing state, the output data is logged and analyzed as will be described in greater detail below.

Dense Array Embodiment

Figure 2A:
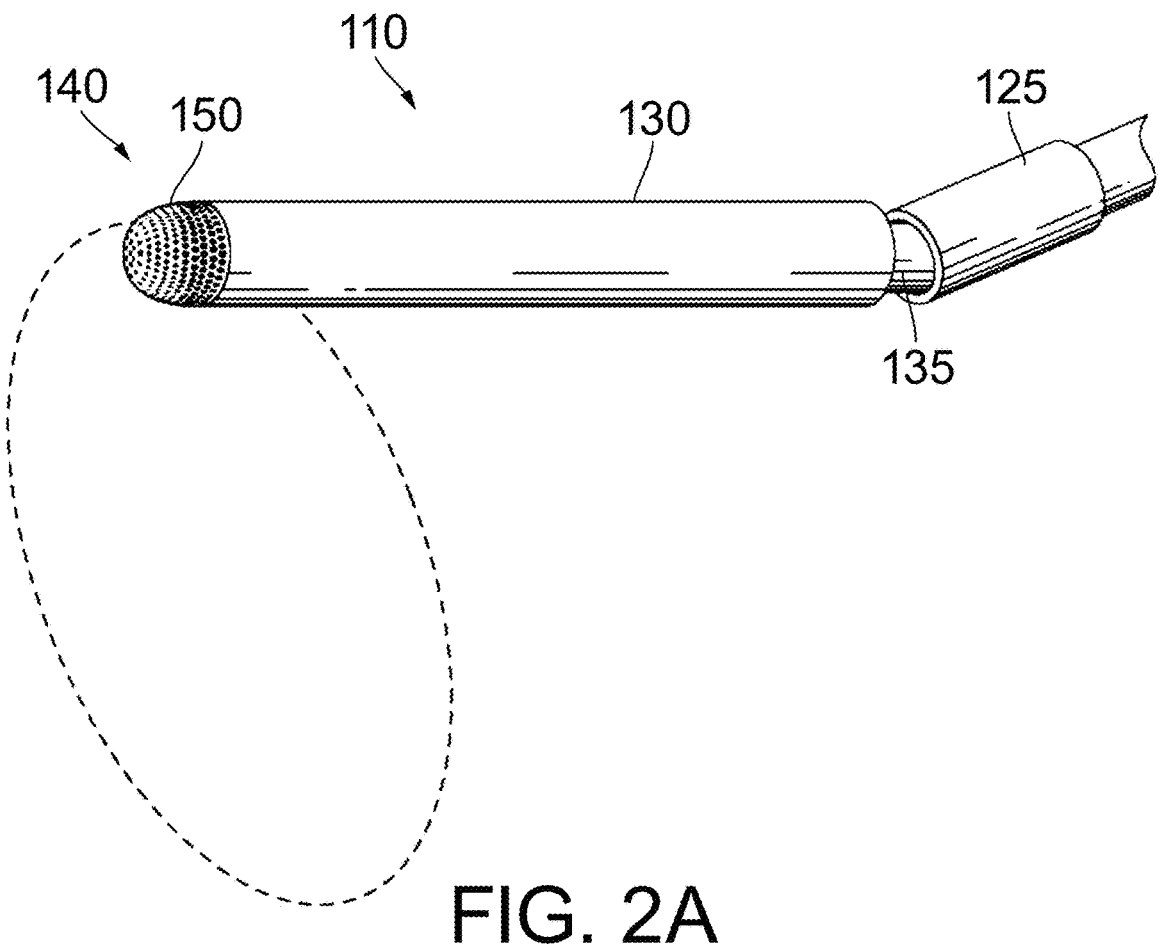
FIG. 2A is a perspective view of a distal section of an apparatus for downhole geometry reconstruction, and feature detection ("downhole apparatus") and classification according to one embodiment of the present disclosure.
Figure 2B:
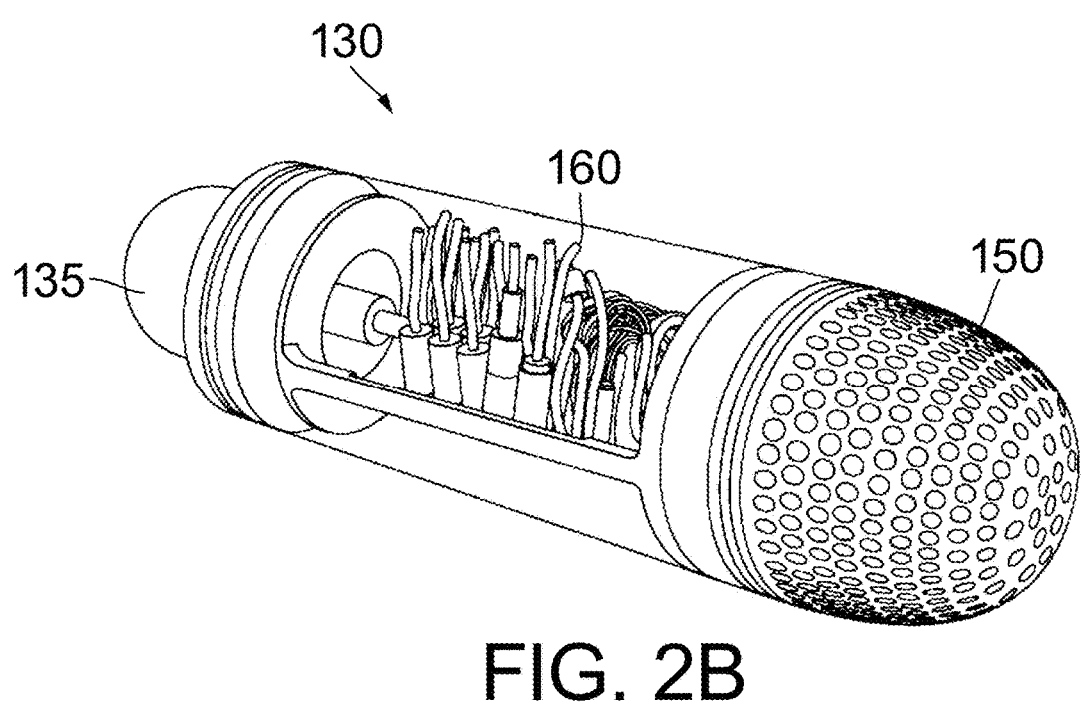
FIG. 2B is a perspective view of a head section of an embodiment of an apparatus for downhole apparatus according to the present disclosure.

A first embodiment of a downhole apparatus according to the present disclosure is shown in FIGS. 2A and 2B. Referring to FIG. 2A, the downhole apparatus 110 includes a body member 125 (of which only a distal section is shown), and a head section 130 coupled to the distal end of the body member 125. The head section 130 is coupled to the body member via a gimbaled joint 135 that enables the head section to pivot with respect to the distal end of the body and to be swept 360 degrees as shown by the dashed circle in FIG. 2A. The gimbaled joint 135 can comprise a ball and socket joint, or other joint mechanisms with at least two degrees of freedom known in the art. The joint can be actuated using a solenoid or similar actuator mechanism to pivot the head section under control of electronic signals.

At the distal end of the head section 130 is a tip 140 on the surface of which an array 150 of ultrasonic transducers is positioned. The array of ultrasonic transducers 150 can be comprised of distinct sensor and actuator (emitter/transmitter) elements or can include elements that combine the functions of detecting and emitting ultrasonic energy. In this context, a "dense" array is an array with at least 50 individual transducer elements, or is one with between 100 and 300 individual transducer elements, or comprises an array with between 100 and 500 transducer elements, as just a few examples without limitation of the range of possibilities. What is important to implementations of the invention is that the array has a number of sensors not be "sparse" (e.g., around 3 or less than 10 sensors). Rather, the number of sensors should be sufficient to enable the determination of downhole geometry and to identify features for detection by the system and method disclosed herein.

The transducer elements 150 are distributed along the entire length and circumference of the tip 140 of the head section. The configuration of the transducer elements can obtain ultrasonic data from a distance directly in front of tip and from an entire cylindrical section of the borehole (i.e., a 3D reconstruction of the borehole in the front to the sides of the sensors). The large number of individual transducer elements in the array 150 improves the ability of the apparatus to determine downhole geometry and detect features through the large amount of time-of-flight data that they collect. As each transducer is positioned at a different longitudinal and azimuthal location, even if only slightly displaced from another transducer in the array, at any given location each will have a different distance and angular relation to particular sections of the periphery of the borehole. Accordingly, each individual sensor receives unique the time-of-flight data from ultrasonic radiation reflected from the periphery of the borehole. The large data yield from having a multiplicity of sensors, increases the resolution and precision of geometrical reconstruction of the borehole. By "multiplicity" in the context of sensors, embodiments should have 20 or more sensors, and more preferably 40 or more sensors, and still more preferably at least 50 sensors.

The head section can be steered through movement of the conveyer and control of the gimbaled joint, to bring the array into near proximity to sections of the borehole periphery to substantially increase systems the effective dynamic range of the apparatus, even in poor sensing conditions such as during multiphase and/or turbulent flow. The head section can also be steered into lateral holes, forks and other downhole formations.

Figure 3:
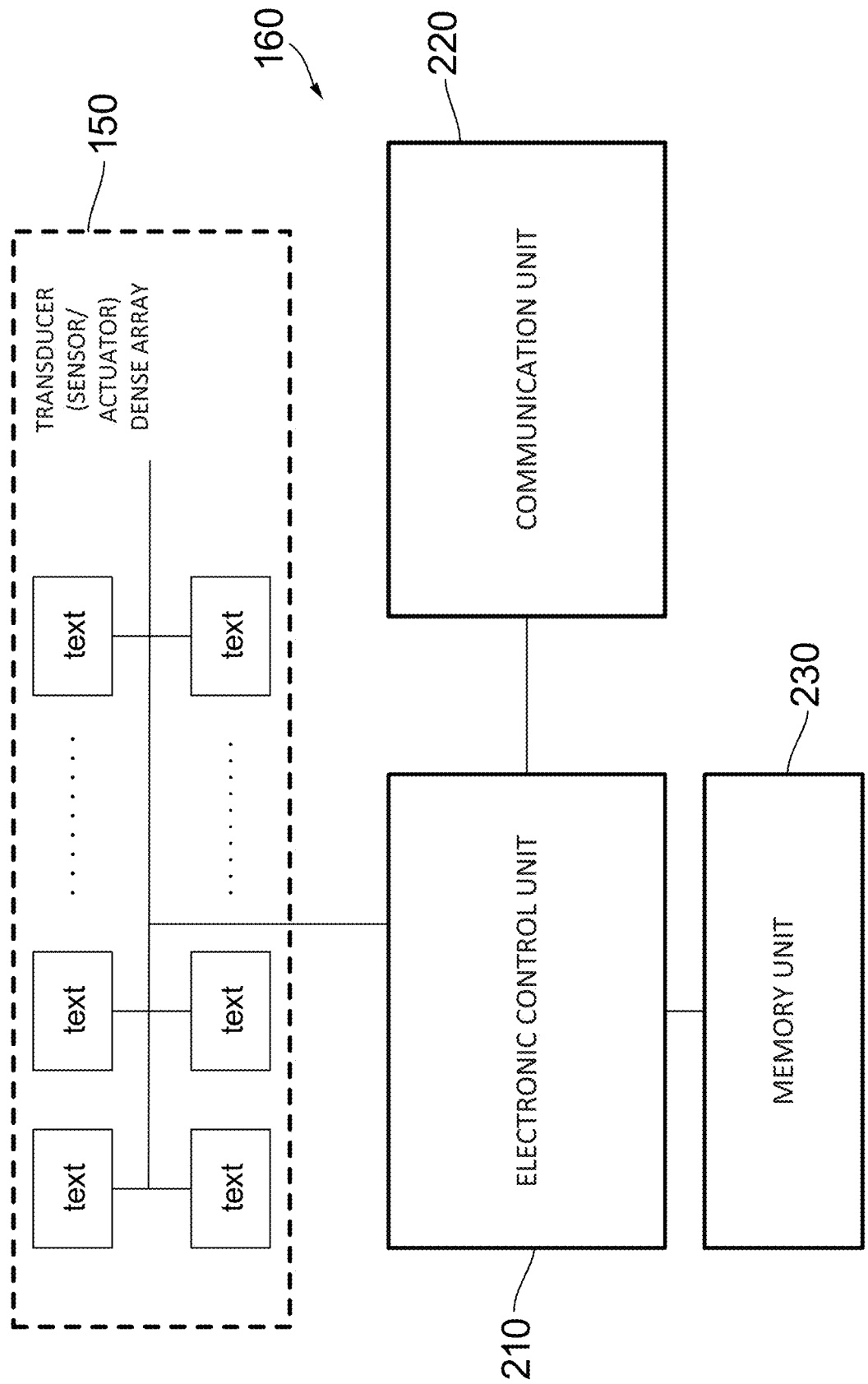
FIG. 3 is a schematic block diagram of an embodiment of the electronic subsystem of the downhole apparatus according to an embodiment of the present disclosure.

FIG. 2B is a perspective view of the head section 130, showing the tip 140 and array 150 in greater detail. A part of the universal joint 135 is shown at the proximal end of the head section. The head section encloses a subsystem 160 of electrical and electronic components for gathering, preprocessing and communicating ultrasonic sensor data. In some implementations, the electronic components can perform higher-level processing tasks and operations including execution of an ultrasonic pulse timing algorithm. FIG. 3 is a schematic diagram showing an embodiment of the electronic subsystem. The subsystem 200 includes an electronic control unit 210 that is coupled to the array of transducers 150, to a communications unit 220, and to a memory unit 230. The communication unit 220 can include a transmitter and receiver and can operate using one or more a variety of communication protocols known in the art. In some embodiments, the communications unit is electrically coupled directly to the processing station 120 via the conveyor 115. The electronic control unit 210 can also be coupled to the actuator of the gimbaled joint to control pivoting movements of the head section. Alternatively, the pivoting movements of the head section can be controlled remotely via the processing station 120.

The electronic control unit 210 is configured to operate the array 150 by executing one or more programs stored on the memory unit 230, or by executing command signals received from the processing station 120 via the communication unit 220. For instance, the electronic control unit 210 is configured to transmit signals to the ultrasonic actuators of the array 150 that cause, at precisely set time, a subset or the entire group of ultrasonic actuators in the array to emit ultrasonic radiation, for a prescribed duration, towards the periphery of the bore hole. Conversely, the electronic control unit is configured to receive electrical signals output from the ultrasonic sensors of the array. The electronic control unit 210 can be configured to perform preprocessing of the signals received from the array including analog-to-digital conversion, normalization, and various types of consolidation and formatting. This preprocessing of the received sensor output converts the data into a form that is communicated to the ground processing station 120 via the communication unit 220, which can employ preprocessed data to perform geometrical reconstruction and feature identification. Alternatively, the electronic unit 210 can be configured to perform additional processing tasks otherwise performed by the processing station 120, such as, but not limited to, determining time-of-flight paths for the emitted and received ultrasonic signals, ultrasonic pulse modulation.

Figure 4:
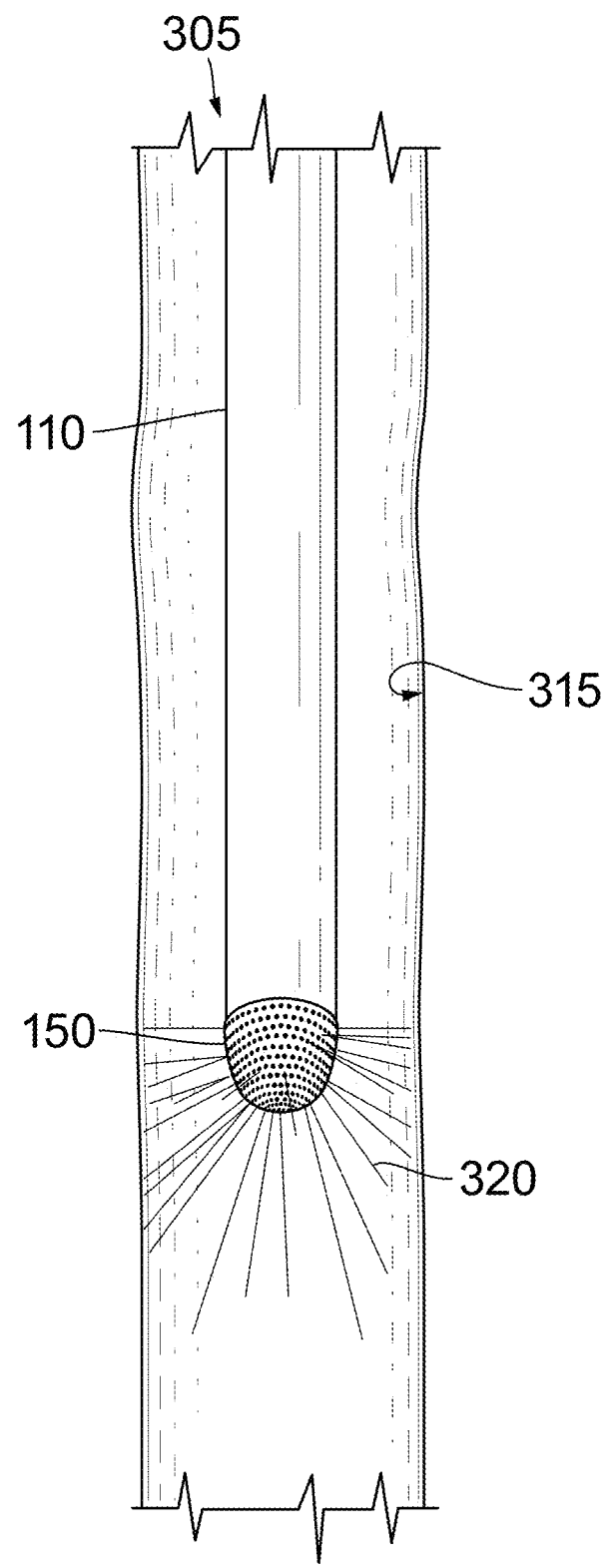
FIG. 4 depicts a downhole apparatus according to the present disclosure deployed inside a section of a borehole.

FIG. 4 depicts a downhole apparatus 110 according to the present disclosure deployed inside a section of a borehole 305 in order to capture "caliper" readings of the diameter of the borehole and to detect any variations in the diameter or other surface features of the peripheral wall 315 of the borehole. As shown, the transducers of the array emit ultrasonic radiation 320 azimuthally at a wide range of angles to capture information from the entire circumferential span of the borehole periphery 315. The diameter (D), which is measured normally to the longitudinal axis of the borehole, is determined from ultrasonic radiation reflected from the borehole periphery that is received by the sensors of the array. Additionally, a portion of the transducers emit signals that are directly longitudinally in front of the tip of the apparatus. This enables the apparatus to detect objects and features in the borehole directly in front of apparatus, which aids both navigation of the apparatus and geometrical construction of the borehole system. The fluid environment in the interior 315 of the borehole 305 can include a number of different components (multiphase) and can also be turbulent, which can affect the path of the ultrasonic radiation as it is emitted, reflected at the borehole periphery and received at the sensors. The "dense" array aids in eliminating most of the distortions induced by such factors as it increases the likelihood of receiving time-of-flight paths that suffer little distortion, and from which the distortion that occur on other trajectories can be calibrated.

Figure 5:
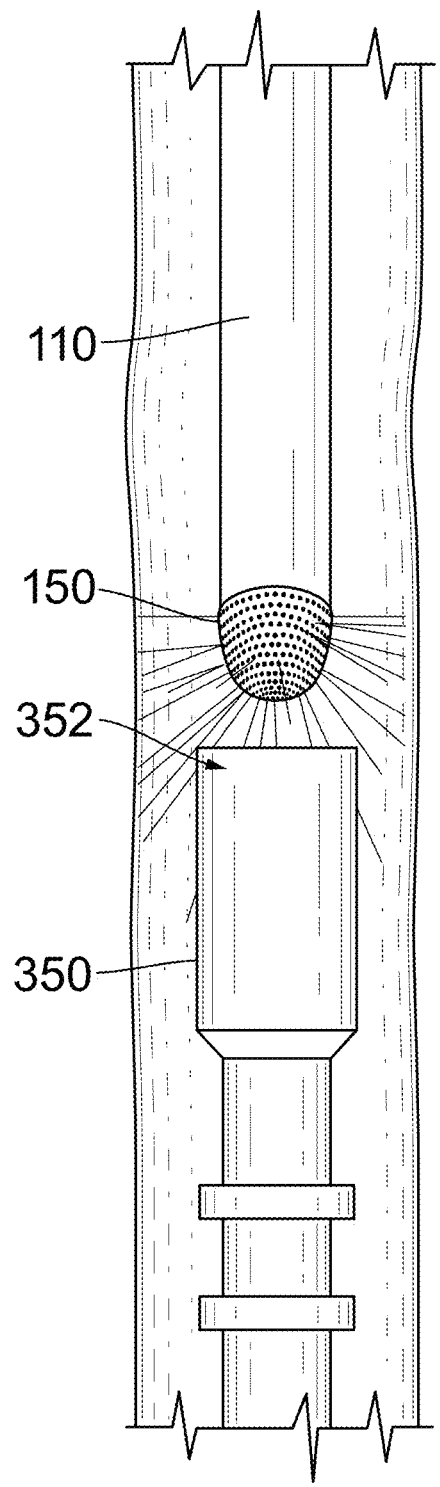
FIG. 5 depicts an exemplary scenario in which a downhole apparatus according to the present disclosure is deployed in a borehole above and proximate to a landing nipple of a production string.

FIG. 5 depicts an exemplary scenario of a deployment of a downhole apparatus according to the present disclosure. In FIG. 5, the downhole apparatus 110 is shown positioned above and proximate to a so-called "landing nipple" 350 that is used to place flow control devices in the completion string of well production tubing. As noted above, the "dense" array 150 has a multiplicity of transducers positioned emit radiation directly forward from the tip (in the figure shown, downwardly) with associated sensors that can detect reflected ultrasonic radiation from features directly in front of the downhole apparatus before any physical contact between the apparatus and feature. The high-resolution of the array and its ability to be pivoted enables the downhole apparatus to obtain sufficient data to accurately model the geometric dimensions and features of the opening 352 of the landing nipple feature exposed to the ultrasonic radiation emitted by the array. The accurate modeling of the landing nipple 350 in turn enables flow control or other devices to be more rapidly and safely delivered for production completion. The downhole apparatus is capable of detecting other types of equipment previously installed in the borehole.

Figure 6:
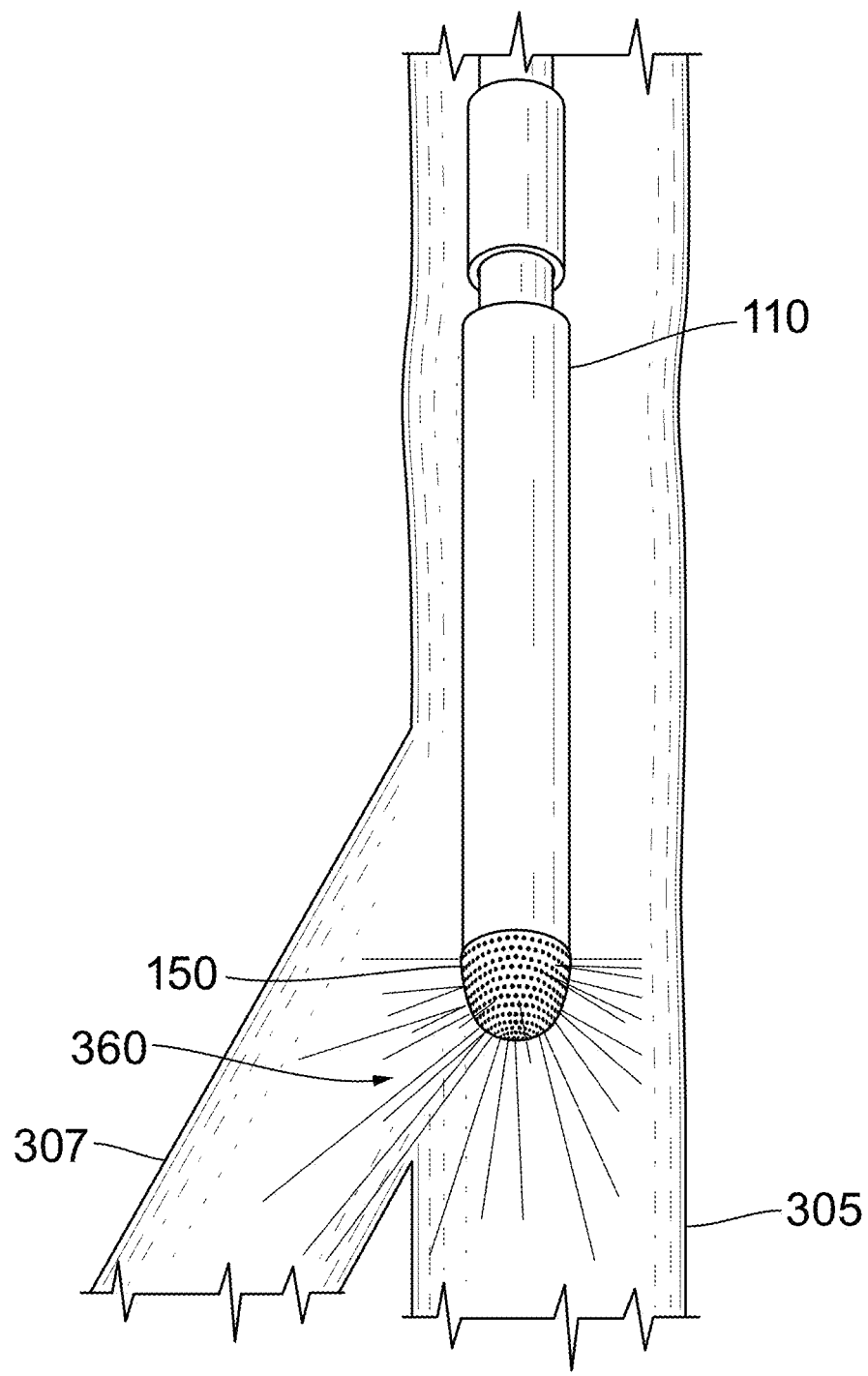
FIG. 6 depicts an exemplary scenario in which a downhole apparatus according to the present disclosure is deployed in a borehole above and proximate to a junction at which lateral branches from a main borehole.

FIG. 6 shows another exemplary scenario of a deployment of a downhole apparatus. In this scenario, the downhole apparatus 110 is shown positioned above and proximate to a junction 360 in the borehole at which a lateral window 307 ("lateral") branches of from the main borehole 305. In this scenario as well, the array is able to sense the presence of the junction 360 before contact via the forward sensing mode provided by the forward aligned actuators and sensors. The downhole apparatus can then be maneuvered within the main borehole 305 sequentially into the lateral 307 for gathering additional ultrasonic time-of-flight data to model the dimensions and features of each branch, if desired.

Figure 7:
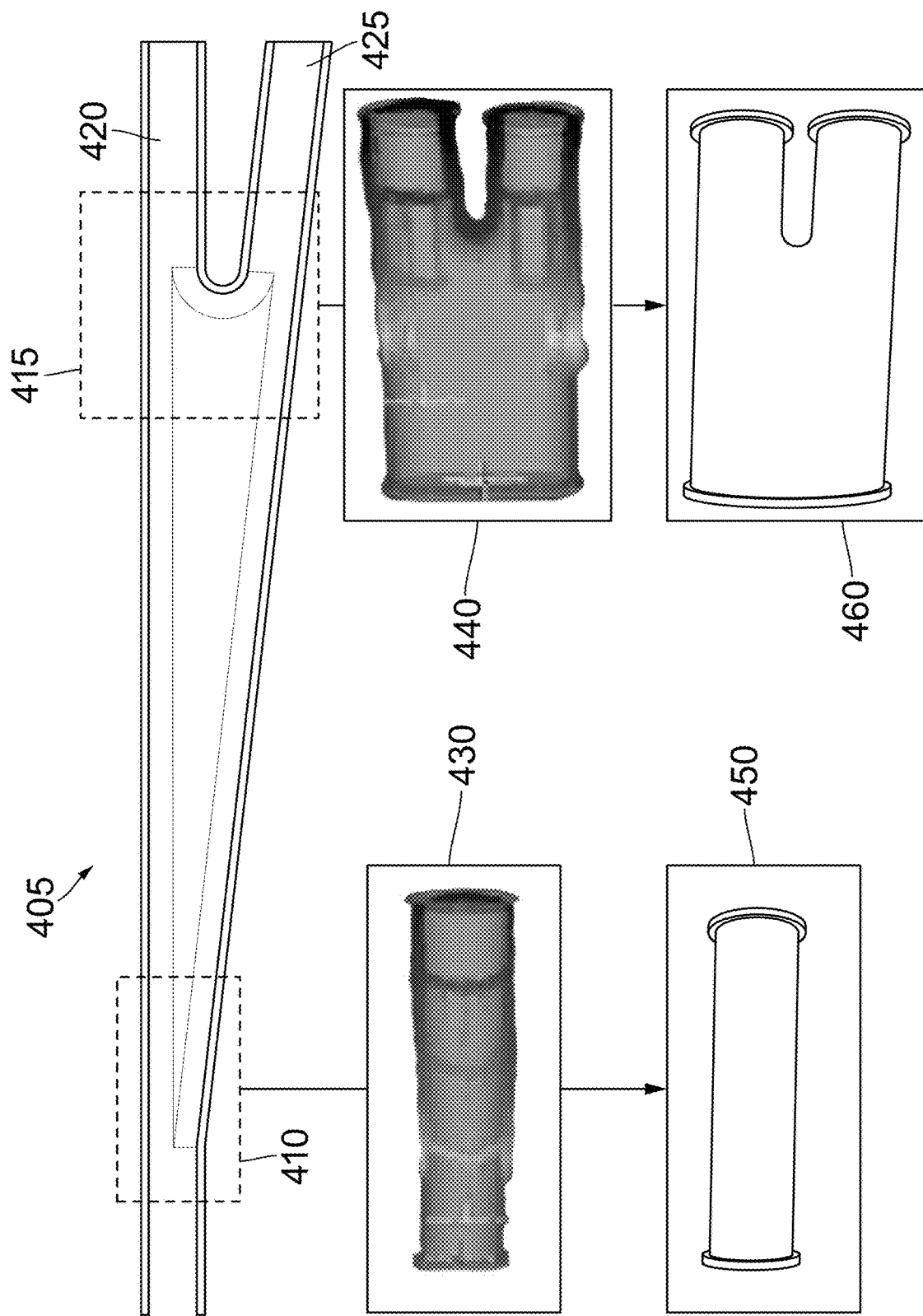
FIG. 7 illustrates the generation of occupancy grids and three-dimensional reconstructions from ultrasonic time-of-flight data generated in a borehole at an incipient lateral subsection and at a downstream subsection at which the borehole has split into two distinct boreholes.

FIG. 1 illustrates how reconstructions are generated using ultrasonic data. These reconstructions can be performed by the processing station by execution of stored algorithms, or in some embodiments, by the electronic control unit of the downhole apparatus. In FIG. 7, a borehole section 405 is shown. The borehole section has two subsections of interest, an incipient lateral formation 410 and a downstream subsection 415 in which two branches of the borehole 420, 425 are distinct. A first occupancy grid 430 is a graphical rendering of ultrasonic time of flight data received from the sensors of the array when positioned proximate to the incipient lateral formation subsection 410. A second occupancy grid 440 is a graphical rendering of ultrasonic time of flight data received from the sensors of the array when positioned proximate to subsection 415. The time of flight measurements are input to triangulation algorithms to determine a distance from the sensors to the structural features of the bore hole that reflect ultrasonic radiation. More particularly, the occupancy grids 430, 440 reflect the probability that a particular cell in the line of sight of the sensor array is occupied. Occupancy grid 430 can be used to create a three-dimensional (3D) reconstruction of subsection 450, and occupancy grid 440 can be used to create a 3D reconstruction of subsection 460. Both reconstructions can be generated in real time based on data received from the deployed downhole apparatus.

Disc Scanner Embodiment

Figure 8:
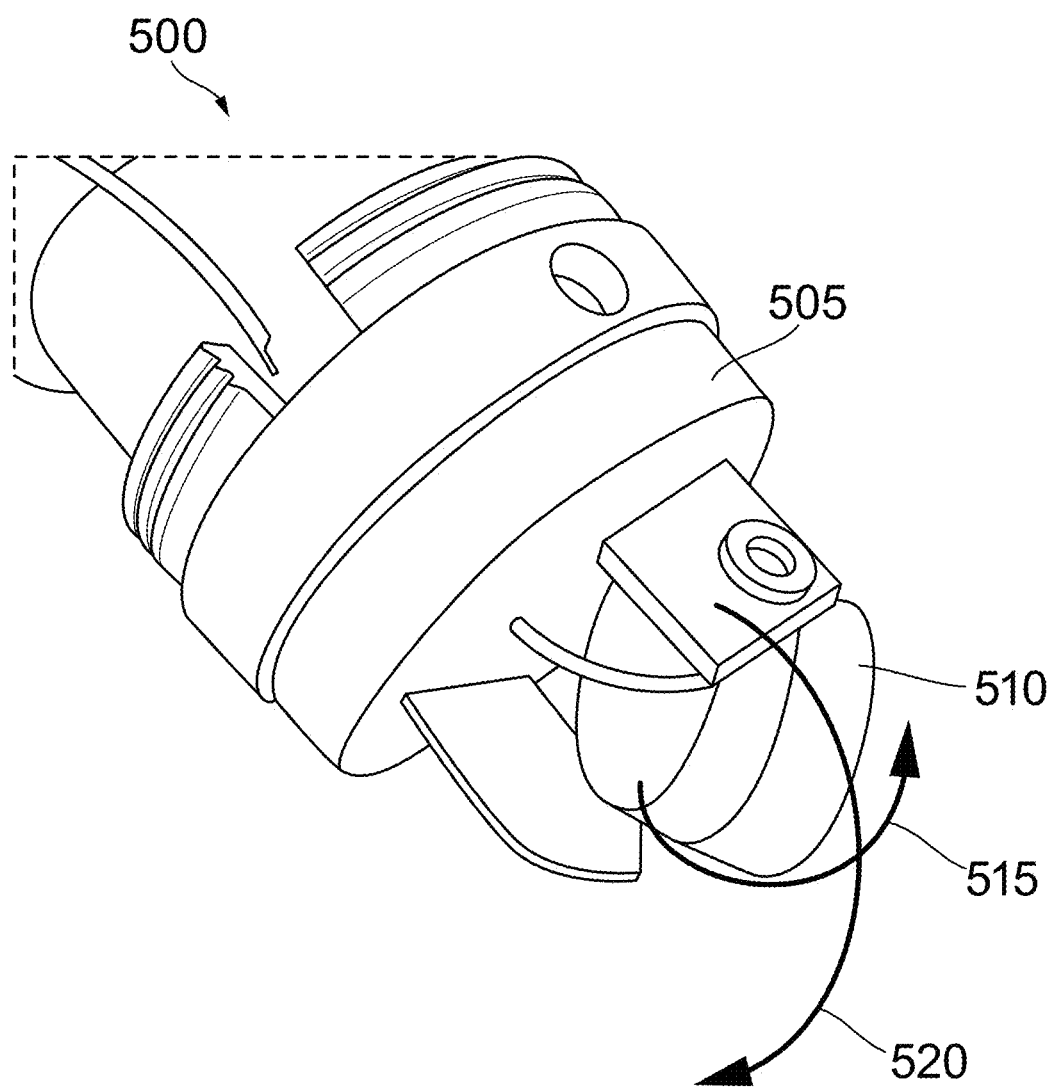
FIG. 8 is a perspective view of a second embodiment of a downhole apparatus according to the present disclosure having a single pivotable transducer.

A second embodiment of a downhole apparatus 500 according to the present disclosure is shown in FIG. 8. In this embodiment, the downhole apparatus includes head section 505 having a pivotable disk-shaped transducer 510 positioned at its distal end. The diameter of the transducer can be between 25 percent and 75 percent of the diameter of the head section of the apparatus, although other sizes can also be used. Making the diameter of the transducer relatively large enables the beam width of the ultrasonic radiation to be minimized. When in a base position, the plane of the transducer 510 is aligned perpendicularly to the longitudinal axis of the downhole apparatus.

The transducer is pivotable in two degrees of freedom using actuators and mechanisms known in the art. A first degree of freedom is indicated by arrow 515 (pitch) and a second degree of freedom is indicated by arrow 520 (roll). The axes of the degrees of freedom, on which the transducer pivots, are perpendicular to the longitudinal axis of the body of the downhole apparatus. The maneuverability of the head section discussed above, and the degrees of freedom of movement of the disk-shaped transducer enable the transducer to produce scan lines across its sweep angles on multiple planes to gather sufficient ultrasonic time-of-flight date to create a three-dimensional reconstruction as in the sensory array embodiment. The transducer 510 can emit an ultrasonic beam set at a single frequency. In some implementations, the apparatus is equipped with a fluid supply line and outlet to provide a fluid bath for the transducer element 510 to match impedance to the surroundings.

Figure 9:
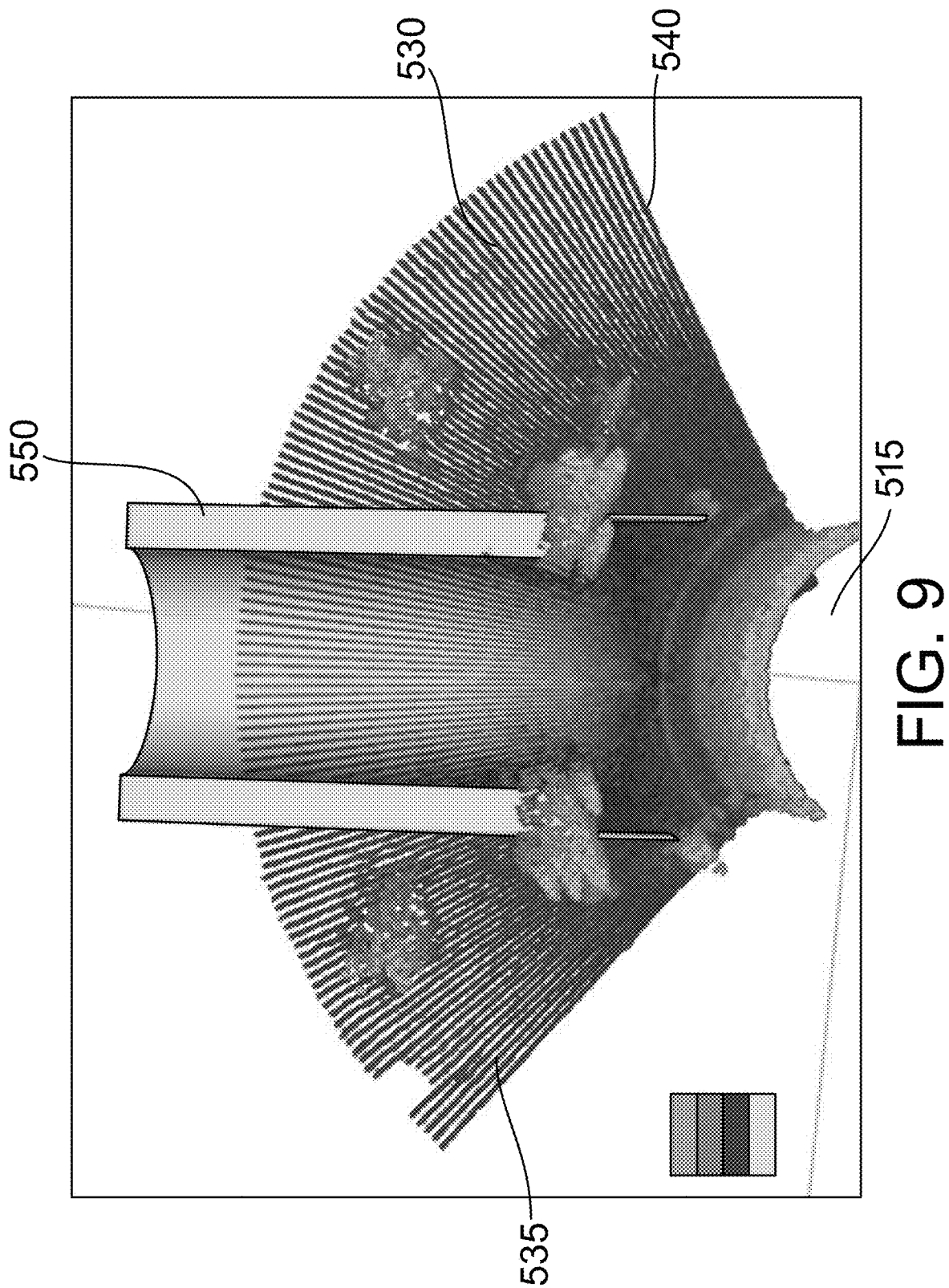
FIG. 9 shows a computer-generated visualization of reconstructed planar geometry as performed by a mechanically swept transducer shown in FIG. 8.

FIG. 9 shows a computer-generated visualization of reconstructed planar geometry as performed by a mechanically swept single element transducer shown in FIG. 8. FIG. 9 shows the angular breadth of individual ultrasonic beams 530 that are emitted from the transducer 515 as it pivots and sweeps between first and second ends 535,540. A three-dimensional reconstruction of the borehole 550 is shown superimposed on the planar geometry of the scan visualization.

Pulse Compression

The present disclose also discloses a method used to increased aid the downhole detection apparatus described above by increasing the signal-to-noise ratio and dynamic range. In this method, the electronic unit of the downhole apparatus generates signals that cause the actuators of the sensor array or sweeping element to modulate the pulse which generates the ultrasonic wave. When reflected ultrasonic signals are received by the sensors of the apparatus, the received signals are correlated with the modulated transmitted pulses using matched filters. In some implementations, the electronic control unit of the downhole apparatus is equipped with electronics adapted to perform high speed analog signal captures.

In some implementations, pulse compression process involves actively driving the piezoelectric transducer(s) for up tens of microseconds as opposed to driving it via an impulse. This imparts more energy into the medium. The returned signal, after reflecting off of a target, has more energy as a result. Dynamic range is also increased as the transmitted pulse propagates further before being attenuated to the point where it is no longer discernable from noise. The driving waveform is modulated to utilize all of the available system bandwidth and to encode as much information as possible. The resolution of detection is a direct function of the signal bandwidth. The increased bandwidth of the driving waveform provides greater resilience to noise with the use of a matched filter. Matched filtering is an optimal technique to employ with a signal which is subject to gaussian white noise. The matched filtering process correlates the collected data with the driving waveform. Additional algorithms can be executed to predict effects of the downhole environment on the propagated waves. The downhole environment, which is typically an attenuating medium, acts like a low-pass filter because, in attenuating media, higher frequencies of acoustic energy are attenuated disproportionally compared to lower frequencies. This information is used to modulate the matched filter process to create a "mismatched filter" process, in which the collected data is correlated with an altered rendition of the driving wave which accounts for the attenuating environmental effects. The mismatched filter improves performance especially in the presence of multiphase flow in which the acoustic attenuation of the mixture of fluids is subject to change under different environmental conditions.

Figure 10:
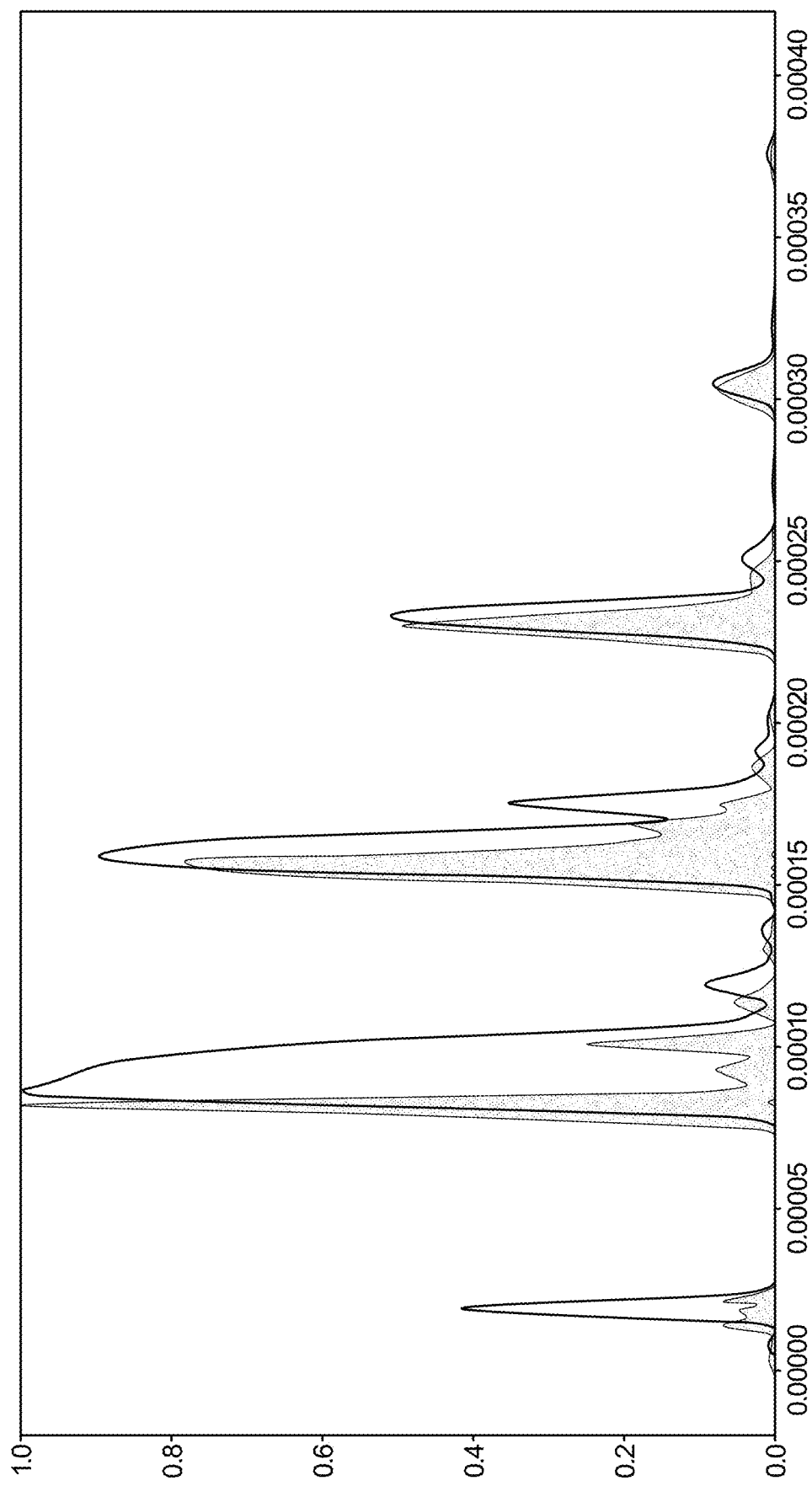
FIG. 10 is a graph which compares signals received using the disclosed pulse compression and matched filter method (and signals received using conventional methods.

FIG. 10 is a graph which compares signals received using the disclosed pulse compression and matched filter method (shown in dashed outline) and signals received using conventional methods. The signals received using the disclose pulse compression method show significantly more detail and additional peaks that are obscured when a pulse compression and matched filter algorithm are not implemented.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, or components, but do not preclude the presence or addition of one or more other features, integers, steps, operations, elements, components, or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An apparatus for detecting and determining geometric features inside a borehole comprising:
   a body section coupled to and deployable in the borehole by a conveyor;
   a head section having a first end pivotably coupled to the body section via a joint and a second end including an array of ultrasonic transducers, the array of transducers comprising a multiplicity of individual actuator elements and a multiplicity of individual sensor elements;
   an electronic control unit configured to:
   a) control timing of emission of ultrasonic radiation from the actuator elements of the array,
   b) receive signals generated by the sensor elements of the array,
   c) control movement of the head section via an actuator coupled to the joint,
   d) trigger the actuator elements of the array using pulses for up to tens of microseconds by which ultrasonic energy is transmitted in the form of a modulated driving waveform with higher energy as compared to driving the actuator elements using an impulse to thereby increase the dynamic range of signals received in return; and
   e) correlate the signals received in return at the sensor elements, which signals have a Gaussian noise profile and are attenuated due to effects of an environment of the borehole with an altered version of the driving waveform transmitted by the actuator elements that accounts for attenuating effects of the environment.

2. The apparatus of claim 1, wherein the joint at which the head section is coupled to the body is a gimbaled ball and socket joint having an actuator controllable by the electronic control unit.

3. The apparatus of claim 1, wherein the array includes between 100 and 200 transducers, each transducer having an actuator element and a sensor element.

4. The apparatus of claim 1, further comprising a communication unit, wherein the electronic control unit is configured to transmit data from signals received from the sensors of the array to a processing station at which the data is used to reconstruct downhole geometry and to detect and identify downhole features.

5. An apparatus for detecting and determining geometric features inside a borehole comprising:
   a body section having a longitudinal axis coupled to and deployable in the borehole by a conveyor;

a head section having a first end coupled to the body section via a joint and a second end including a disk-shaped transducer pivotable on at least one axis perpendicular to the longitudinal axis of the body section, the disk-shaped transducer having an actuator element that emits ultrasonic radiation and a sensor element that receives ultrasonic radiation; and an electronic control unit configured to:
a) control timing of emission of ultrasonic radiation from the actuator of the transducer,
b) receive signals generated by the sensor elements of the transducer,
c) control movement of the transducer so as to cause a face of the transducer to sweep across an angle covering a width of the borehole,
d) trigger the actuator elements of the array using pulses for up tens of microseconds by which ultrasonic energy is transmitted in the form of a modulated driving waveform with higher energy as compared to driving the actuator elements using an impulse to thereby increase the dynamic range of signals received in return; and
e) correlate the signals received in return at the sensor elements, which signals have a Gaussian noise profile due to attenuating effects of an environment of the borehole, with an altered version of the driving waveform transmitted by the actuator elements that accounts for attenuating effects of the environment.

6. The apparatus of claim 5, wherein the disk-shaped transducer has two degrees of freedom and is pivotable on two perpendicular axes, each of which are perpendicular to the longitudinal axis of the body of the apparatus.

7. The apparatus of claim 5, further comprising a communication unit, wherein the electronic control unit is configured to transmit data from signals received from the sensor of the transducer to a processing station at which the data is used to reconstruct downhole geometry and to detect and identify downhole features.

8. A system for geometrical reconstruction and feature detection and identification with a borehole comprising:
a conveyor for delivering an apparatus into a borehole, a downhole apparatus coupled to the conveyor including:
a body section coupled to and deployable in the borehole by a conveyor;
a head section having a first end pivotably coupled to the body section via a joint and a second end including an array of ultrasonic transducers, the array of transducers comprising a multiplicity of individual actuator elements and a multiplicity of individual sensor elements;
an electronic control unit configured to:
control timing of emission of ultrasonic radiation from the actuator elements of the array,
receive signals generated by the sensor elements of the array reflected from within a section of the borehole,
control movement of the head section via an actuator coupled to the joint,
trigger the actuator elements of the array using pulses for up to tens of microseconds by which ultrasonic energy is transmitted in the form of a modulated driving waveform, with higher energy as compared to driving the actuator elements using an impulse to thereby increase the dynamic range of signals received in return; and
correlate the signals received in return from the sensor elements, which signals have a Gaussian noise profile and are attenuated due to effects of an environment of the borehole with an altered version of the driving waveform transmitted by the actuator elements that accounts for attenuating effects of the environment; and a processing station communicatively coupled to the electronic control unit of the downhole apparatus, the processing station including a processor configured to receive sensor data from the electronic control unit and to execute program instructions for reconstructing a geometry and identify features of the borehole section.

9. The system of claim 8, wherein the reconstruction of the geometry of the borehole section includes determine a diameter of the borehole section, identifying lateral or branches, and detecting objects previously installed in the borehole section.

10. The system of claim 8, wherein the joint at which the head section is coupled to the body of the downhole apparatus is a gimbaled ball and socket joint having an actuator controllable by the electronic control unit.

11. The system of claim 8, wherein the array of the downhole apparatus includes between 100 and 200 transducers, each transducer having an actuator element and a sensor element.

12. A method for reconstructing a geometry and detecting and identifying features in a borehole comprising:
positioning a downhole apparatus in the borehole having at least one ultrasonic actuators and at least one ultrasonic sensor;
controlling the at least one actuator of the downhole apparatus to transmit a modulated driving waveform of ultrasonic radiation that includes pulses of up to tens of microseconds in duration azimuthally and in a forward direction, the modulated driving waveform having higher energy as compared to impulse waveforms to thereby increase the dynamic range of signals received in return;
receiving ultrasonic signals at the at least one ultrasonic sensor;
correlating the signals received in return at the at least one sensor, which signals have a Gaussian noise profile and are attenuating due to effects of an environment of the borehole with an altered version of the driving waveform transmitted by the actuator elements that accounts for the attenuating effects of the environment; and
reconstructing a geometry of the borehole and features within the borehole using the signals received from the at least one sensor, as correlated with the transmitted modulated driving waveform.

13. The method of claim 12, wherein the downhole apparatus includes an array of transducers comprising a multiplicity of individual actuator elements and a multiplicity of individual sensor elements.

14. The method of claim 13, wherein the array is positioned on a pivotable tip of the downhole apparatus.

15. The method of claim 12, wherein the downhole apparatus has a tip including a disk-shaped pivotable transducer pivotable, the disk-shaped transducer having an actuator element that emits ultrasonic radiation and a sensor element that receives ultrasonic radiation.

16. The method of claim 15, wherein the downhole apparatus has a longitudinal axis and wherein the disk-shaped transducer has two degrees of freedom and is pivotable on two perpendicular axes, each of which are perpendicular to the longitudinal axis of the body of the apparatus.

* * * * *